Aug. 15, 1933.　　　　N. ATTERBURY　　　　1,922,190
VALVE
Filed Sept. 4, 1931
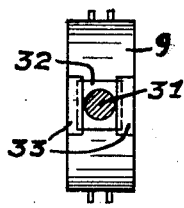
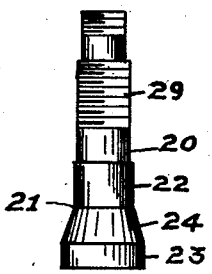
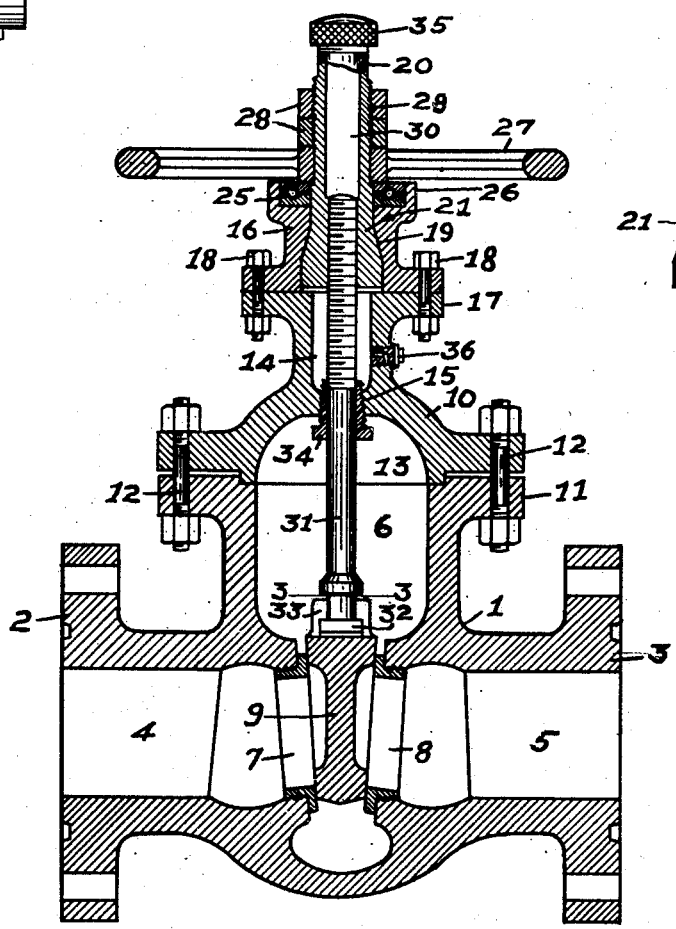
INVENTOR
Niles Atterbury
By Jas R Dryden
Attorney Patented Aug. 15, 1933

1,922,190

UNITED STATES PATENT OFFICE 1,922,190

VALVE

Niles Atterbury, Pittsburgh, Pa.

Application September 4, 1931. Serial No. 561,200

1 Claim. (Cl. 251—62)

My invention relates to valves, and while the invention is herein disclosed as embodied in a gate valve, it is obvious that the principle of the invention may be employed in any other type of valve or for any other purposes wherein it is found to be applicable.

Important objects of the invention are to provide a valve of the character described, which requires no packing to render same impervious to leakage, which is simple in its construction and arrangement, durable and efficient in its use, compact, positive in its action, readily operable, and comparatively inexpensive to manufacture and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a vertical cross sectional view of the gate valve constructed in accordance with the invention.

Figure 2 is a side elevational view of the seating stem.

Figure 3 is a sectional view on line 3—3, Figure 1.

Referring in detail to the drawing, 1 denotes a body portion or valve casing having flanged ends 2 and 3 for permitting the connection of the device in an associated conduit in the manner well known in the art.

The valve casing 1 is provided with communicating passages 4 and 5, which extend through respective valve ends 2 and 3. The inner ends of the passages 4 and 5 communicate with the lower end of a valve chamber 6, which is formed in the valve casing 1 and extends at right angles relatively to the said passages 4 and 5.

A pair of seat rings 7 and 8 are threadedly secured in the inner ends of respective passages 4 and 5. The inner faces of the seat rings 7 and 8 are inclined and adapted for seating a vertically adjustable valve member in the form of a disk gate 9, which is disposed therebetween. The disk gate 9 is tapered to effect a wedging action when shifting vertically against the inclined inner faces of the seat rings 7 and 8 in closing the valve.

A flanged bonnet 10 is mounted on the flanged top 11 of the valve casing 1, and secured in position by a plurality of bolts 12. The lower end of the bonnet 10 is formed to provide a recess 13 complemental to the valve chamber 6. The upper portion of the bonnet 10 is provided with a chamber 14 having a threaded bottom aperture 15. The latter establishes communication between the bonnet chamber 14 and the valve chamber 6.

A flanged seating head 16 is mounted on the flanged bonnet top 17 and secured to the latter by a plurality of bolts 18. The seating head 16 is provided with a bearing bore 19, which is formed to provide a reduced straight upper portion, an enlarged straight lower portion, and a tapered intermediate portion.

The seating head 16 provides a bearing for a tubular seating stem 20, which has its lower seating end 21 revolubly seated in the bearing bore 19 of the seating head 16. The seating end 21 of the stem 20 is shaped to conform to the bearing bore 19, having a reduced straight upper portion 22, an enlarged straight portion 23, and a tapered or cone-shaped intermediate portion 24, which portions 22, 23 and 24 seat in respective correspondingly shaped portions of the bearing bore 19 in the seating head 16.

A ball bearing 25 is suitably mounted and housed in the top 26 of the seating head 16. The ball bearing 25 is provided to facilitate the operation of the hand wheel 27, which engages the former and mounted on the seating stem 20 directly above the seating portion 22. The hand wheel 27 is secured to the seating stem 20 to rotate with the latter, by a pair of lock nuts 28 engaging on the threaded upper portion 29 of the seating stem 20.

The lower portion of the seating stem bore 30 is threaded for the engagement of the upper threaded portion of an operating screw 31, which extends through the bonnet chamber 14, and the valve chamber 6. The operating screw 31 is provided with a rectangularly shaped foot 32, which is engaged between a pair of spaced lugs 33. The latter are formed integral with the center of the top of the disk gate 9.

The rotation of the seating stem 20 by the manipulation of the hand wheel 27 will impart vertical movement to the operating screw 31 and shift the disk gate 9 to the opening or closing positions. The upper portion of the seating stem bore 30 provides clearance for the upper end of the operating screw 31 when operated to shift the disk gate 9 to the open position. The connection of the operating screw 31 with the disk gate 9 provides a flexible connection permitting the proper seating of the latter between the seat rings 7 and 8 when the disk gate 9 is in its closing position.

The operating screw 31 extends through a guide sleeve 34, which has a tapering threaded periphery engaging in the threaded bottom aperture 15 in the bonnet 10. The guide sleeve 34 is preferably constructed from compressible material whereby the same may be forced into position around the operating screw 31 to prevent the leakage of fluid into the bonnet chamber 14 while permitting the vertical movement of the operating screw 31 through the guide sleeve 34.

The top of the seating stem 20 is provided with a threadedly engaged cap 35 establishing a closure element for the seating stem bore 31 and allowing access to the latter for lubricating purposes.

A drain plug 36 is mounted in the side of the bonnet 10 to permit the draining of any fluid that might enter the bonnet chamber 14.

The feature of the present invention resides in the construction of the seating stem 20 and its seating arrangement in the seating head bore 19. The adjustment of the lock nuts 28 draws the seating portion 21 of the stem 20 into leakproof engagement with the seating head bore 19, while permitting the rotation of the stem 20 in the latter to effect the opening and closing of the device in the manner stated. The structure of the seating portion 21 of the stem 20 having the cone-shaped portion 24 between the other seating portions 22 and 23 and functioning in the correspondingly shaped head bore 19, provides an effective operating element for the device and requires no packing.

The present invention provides a most efficient device of its kind, which will function indefinitely without attention, and which obviates the necessity of periodical repacking, as invariably required in analogous devices now in use.

What I claim is:

In combination, a valve comprising a casing providing a valve chamber, a bonnet secured to the top of said casing and having its lower end formed to provide a recess opening into and complemental to said valve chamber, the upper portion of said bonnet being provided with a chamber having a threaded bottom aperture communicating with said valve chamber, a valve member mounted in the latter, a seating head secured to the top of said bonnet and provided with a bearing bore having straight end portions and a cone-shaped intermediate portion, a seating stem having its lower end portion shaped to conform to said bearing bore and being revolubly seated in the latter, said seating stem provided with a bore having an open top and a threaded lower end portion, an operating screw having its lower end revolubly joined with said valve member, said operating screw extending through said bonnet chamber and having a threaded upper portion threadedly engaged in the threaded lower end portion of said seating stem bore, an operating element carried by said seating stem for rotating the latter to actuate said operating screw for shifting said valve member to the opening or closing positions, means carried by said seating stem for adjusting the latter in the bearing bore of said seating head, a guide sleeve for the passage of said operating screw, said guide sleeve being constructed from compressible material and having an adjustable threaded engagement in the bottom aperture of said bonnet bore, a removable closure cap mounted on the top of said seating stem, and a drain plug carried by said bonnet to permit the draining of said bonnet chamber, substantially as described and for the purpose set forth.

NILES ATTERBURY.